United States Patent
Matsuoka (10) Patent No.: US 9,104,994 B2
(45) Date of Patent: Aug. 11, 2015

(54) ORGANIZATION ATTRIBUTE ESTIMATION DEVICE, NON-TRANSITORY COMPUTER READABLE MEDIUM, AND ORGANIZATION ATTRIBUTE ESTIMATION METHOD

(71) Applicant: FUJI XEROX CO., LTD., Minato-ku, Tokyo (JP)

(72) Inventor: Takao Matsuoka, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 167 days.

(21) Appl. No.: 13/627,605

(22) Filed: Sep. 26, 2012

(65) Prior Publication Data

US 2013/0254363 A1 Sep. 26, 2013

(30) Foreign Application Priority Data

Mar. 21, 2012 (JP) ................. 2012-064563

(51) Int. Cl.
  *G06F 15/173* (2006.01)
  *G06Q 10/06* (2012.01)
  *H04L 12/24* (2006.01)

(52) U.S. Cl.
  CPC ............ *G06Q 10/06* (2013.01); *H04L 41/147* (2013.01)

(58) Field of Classification Search
  CPC .................. H04L 41/147; H04L 41/5064
  USPC ................... 707/601–603; 709/223
  See application file for complete search history.

(56) References Cited

U.S. PATENT DOCUMENTS

| | | | |
|---|---|---|---|
| 6,561,212 B1* | 5/2003 | Hsu ............................... | 137/227 |
| 7,051,038 B1* | 5/2006 | Yeh et al. ..................... | 707/603 |
| 7,640,250 B2* | 12/2009 | Furumatsu ........................ | 1/1 |
| 7,949,628 B1* | 5/2011 | Blazek et al. ................. | 707/600 |
| 7,991,859 B1* | 8/2011 | Miller et al. .................. | 709/220 |
| 2009/0097477 A1* | 4/2009 | Zhu ............................... | 370/352 |
| 2011/0314181 A1* | 12/2011 | Guo .............................. | 709/245 |
| 2012/0226703 A1* | 9/2012 | Yamamoto ................... | 707/748 |
| 2013/0096982 A1* | 4/2013 | Miyazaki et al. ............ | 705/7.29 |

FOREIGN PATENT DOCUMENTS

JP 2003-099458 A 4/2003
JP 2006-313520 A 11/2006

* cited by examiner

*Primary Examiner* — Hua Fan
(74) *Attorney, Agent, or Firm* — Sughrue Mion, PLLC (57) ABSTRACT

An organization attribute estimation device includes a software information acquisition unit that acquires software information indicating, for each information processing apparatus used in a certain department of an organization, software used in the information processing apparatus, and a department estimation unit that specifies an estimated class of the certain department on the basis of the software information acquired by the software information acquisition unit.

7 Claims, 9 Drawing Sheets

FIG. 2

| LICENSE CODE | SOFTWARE INFORMATION | LAN ADDRESS INFORMATION | GLOBAL IP ADDRESS | CONTINUOUS OPERATING TIME | INFORMATION GENERATION TIME |
|---|---|---|---|---|---|
| 001 | XXX, YYY | 192.168.1.11/24 | 11.11.11.11 | 480 MINUTES | 2011/12/27 |

FIG. 3

| LICENSE CODE | COMPANY NAME | BUSINESS TYPE |
|---|---|---|
| 001 | A | PRECISION INSTRUMENT |
| 002 | B | PUBLICATION |

FIG. 4

| | PURCHASE · PROCUREMENT | ACCOUNT | PLAN · MARKETING | SOFTWARE DEVELOPMENT | MATERIAL DEVELOPMENT |
|---|---|---|---|---|---|
| VVV | 4 | 2 | 1 | 0 | 0 |
| WWW | 2 | 4 | 1 | 0 | 0 |
| XXX | 0 | 0 | 0 | 8 | 0 |
| YYY | 1 | 1 | 1 | 1 | 2 |
| ZZZ | 0 | 0 | 0 | 1 | 4 |

FIG. 5

| DEPARTMENT | RULE-DEPENDENT RATIO |
|---|---|
| PURCHASE · PROCUREMENT | 1.0 |
| ACCOUNT | 1.0 |
| PLAN · MARKETING | 1.0 |
| SOFTWARE DEVELOPMENT | 0.5 |
| MATERIAL DEVELOPMENT | 1.0 |

FIG. 6

| LICENSE CODE | SOFTWARE INFORMATION | LAN ADDRESS INFORMATION | GLOBAL IP ADDRESS | CONTINUOUS OPERATING TIME | INFORMATION GENERATION TIME |
|---|---|---|---|---|---|
| 001 | XXX, YYY | 192.168.1.11/24 | 11.11.11.11 | 480 MINUTES | 2011/12/27 |
| 001 | XXX | 192.168.1.12/24 | 11.11.11.11 | 420 MINUTES | 2011/12/27 |
| 001 | XXX, YYY | 192.168.1.13/24 | 11.11.11.11 | 400 MINUTES | 2011/12/27 |
| 001 | ZZZ | 192.168.2.11/24 | 11.11.11.11 | 0 MINUTES | 2011/12/27 |
| 001 | YYY, ZZZ | 192.168.2.12/24 | 11.11.11.11 | 0 MINUTES | 2011/12/27 |
| 001 | WWW | 192.168.9.11/24 | 88.88.88.88 | 360 MINUTES | 2011/12/27 |
| 001 | WWW, YYY | 192.168.9.12/24 | 88.88.88.88 | 360 MINUTES | 2011/12/27 |
| 002 | VVV | 172.16.1.11/24 | 99.99.99.99 | 420 MINUTES | 2011/12/27 |
| 002 | VVV, YYY | 172.16.1.12/24 | 99.99.99.99 | 420 MINUTES | 2011/12/27 |

FIG. 8

| | USE NUMBER IN TARGET DEPARTMENT (192.168.1.0/24) |
|---|---|
| WWW | 0 |
| XXX | 3 |
| YYY | 2 |
| ZZZ | 0 |
| VVV | 0 |

FIG. 9

| COMPANY NAME | BUSINESS TYPE | BASE | DEPARTMENT | NUMBER OF MEMBERS | HOLIDAY |
|---|---|---|---|---|---|
| COMPANY A | PRECISION INSTRUMENT | TOKYO | SOFTWARE DEVELOPMENT | 1.5 | – |
| | | | MATERIAL DEVELOPMENT | 2 | THURSDAY |
| | | OSAKA | ACCOUNT | 2 | – |

US 9,104,994 B2

ORGANIZATION ATTRIBUTE ESTIMATION DEVICE, NON-TRANSITORY COMPUTER READABLE MEDIUM, AND ORGANIZATION ATTRIBUTE ESTIMATION METHOD

CROSS-REFERENCE TO RELATED APPLICATIONS

This application is based on and claims priority under 35 USC 119 from Japanese Patent Application No. 2012-064563 filed Mar. 21, 2012.

BACKGROUND

Technical Field

The present invention relates to an organization attribute estimation device, a non-transitory computer readable medium, and an organization attribute estimation method.

SUMMARY

According to an aspect of the invention, there is provided an organization attribute estimation device including, for each information processing apparatus used in a certain department of an organization, a software information acquisition unit that acquires software information indicating software used in an information processing apparatus; and a department estimation unit that specifies an estimated class of the certain department on the basis of the software information acquired by the software information acquisition unit.

BRIEF DESCRIPTION OF THE DRAWINGS

Exemplary embodiments of the present invention will be described in detail based on the following figures, wherein.

DETAILED DESCRIPTION

Hereinafter, embodiments of the invention will be described in detail with reference to the drawings.

Figure 1:
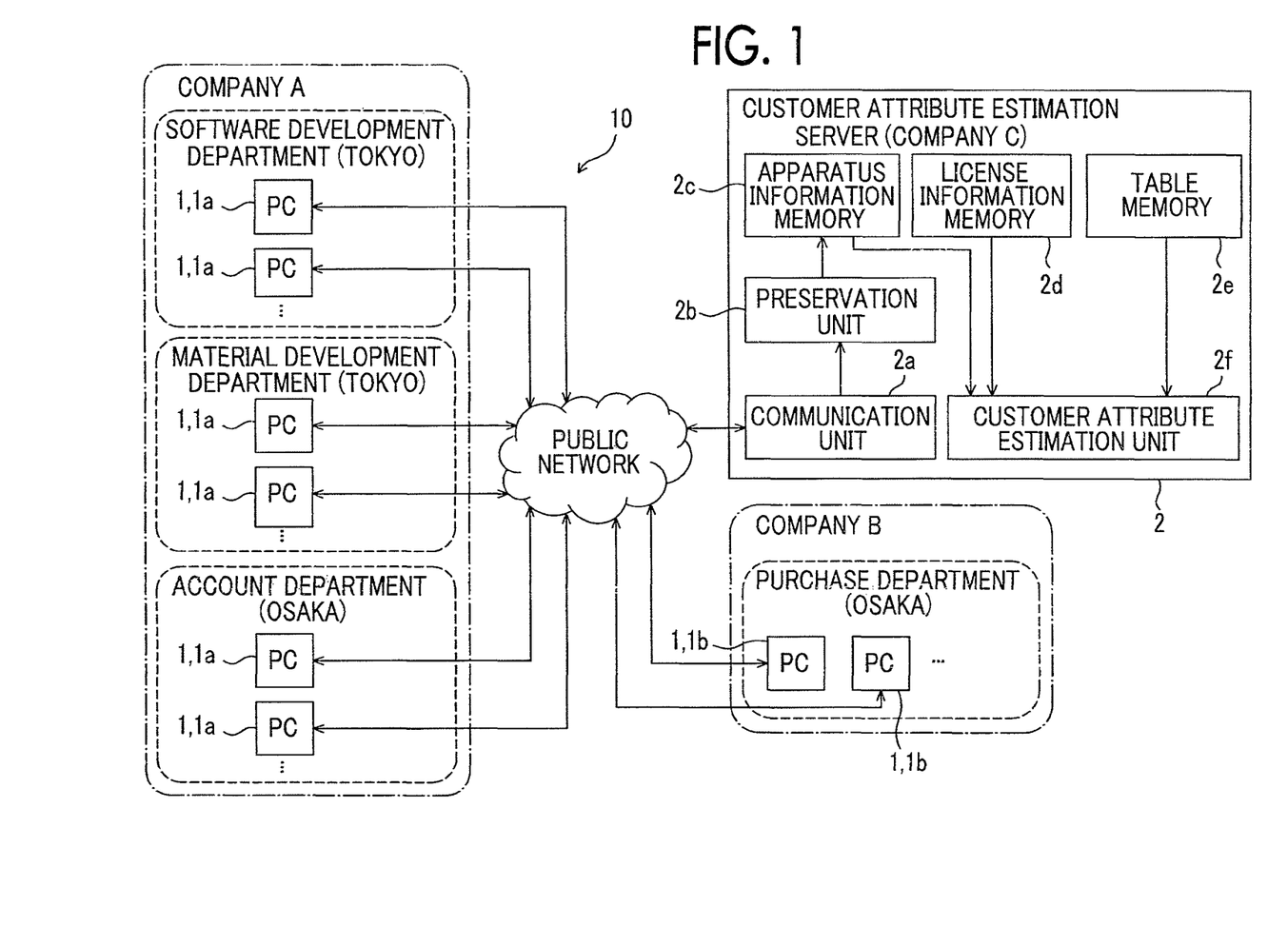
FIG. 1 is a diagram illustrating a configuration of an information processing system.

FIG. 1 is a diagram illustrating a configuration of an information processing system 10. As shown in the same figure, the information processing system 10 includes a customer attribute estimation server 2 possessed by a company C, plural personal computers 1a (hereinafter, referred to as PCs 1a) used by a company A which is a customer of the company C, and plural personal computers 1b (hereinafter, referred to as PCs 1b) used by a company B which is a customer of the company C. The customer attribute estimation server 2, the PCs 1a, and the PCs 1b are connected to a public network so as to communicate therewith. In addition, hereinafter, the PCs 1a and the PCs 1b are collectively referred to as a PC 1 or PCs 1 in some cases.

As shown in FIG. 1, each of the company A and the company B has at least one business base, and at least one department occupies each business base. For example, in FIG. 1, the company A has a business base in Osaka and a business base in Tokyo, the software development department and the material development department occupy the business base in Tokyo, and the account department occupies the business base in Osaka. Here, each department is provided with a local area network. For this reason, the PCs 1 used in the departments are under the local area networks of the departments. For example, the PCs 1a used in the software development department are under the local area network of the software development department. Each business base is provided with a gateway device (not shown), and each of the PCs 1 is connected to the public network via the gateway device.

Figure 2:
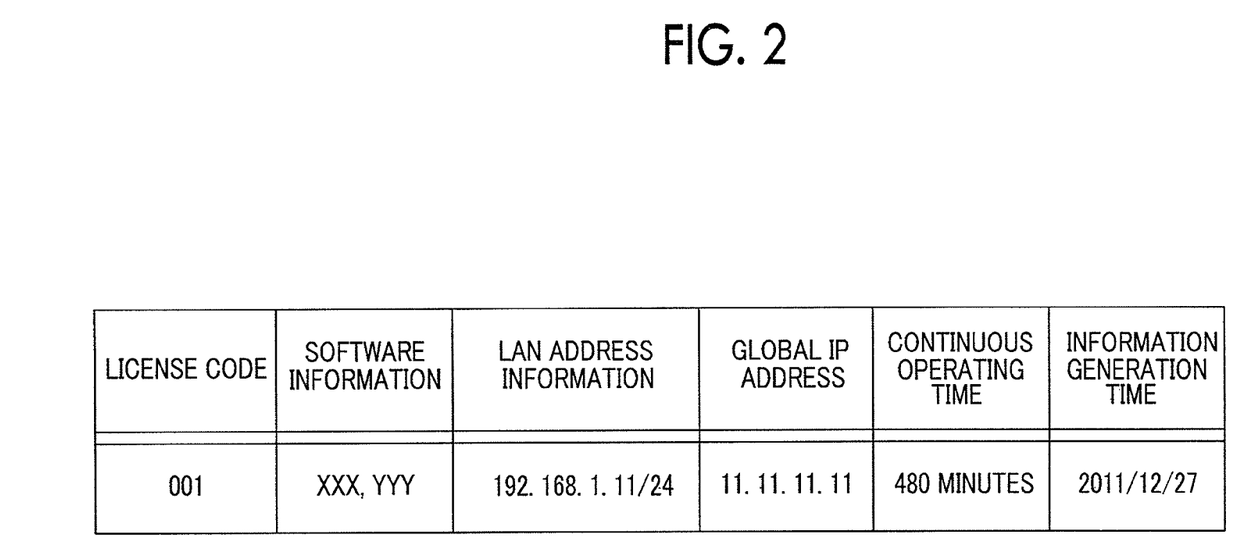
FIG. 2 is a diagram illustrating apparatus information.

An apparatus information collection program which is distributed from the company C to a customer company is installed in each of the PCs 1. The apparatus information collection program is a resident program, and, as a result of the apparatus information collection program being executed, each of the PCs 1 periodically acquires information (hereinafter, referred to as apparatus information) regarding the PC 1 itself, and transmits the acquired apparatus information to the customer attribute estimation server 2. FIG. 2 illustrates apparatus information. As shown in the same figure, the apparatus information includes a license code unique to a customer company which is assigned from the company C. The apparatus information acquired by the PCs 1a includes a license code assigned to the company A, and the apparatus information acquired by the PCs 1b includes a license code assigned to the company B. In addition, the apparatus information includes software information indicating software installed in the PCs 1. Further, the apparatus information includes LAN address information indicating local area networks to which the PCs 1 belong. In the exemplary embodiment, the LAN address information is the local IP address of each of the PCs 1. In addition, the numerical value on the right side of "/" is a numerical value for specifying a portion indicating a local area network of the LAN address information. Furthermore, the apparatus information includes a global IP address indicating an address of the PC 1 in the public network, a continuous operating time of the PC 1, and a generation time of the apparatus information. The LAN address information corresponds to private network information, and the global IP address corresponds to address information.

Next, the customer attribute estimation server 2 will be described. The customer attribute estimation server 2 is a server for collecting an attribute of a customer company from the apparatus information transmitted from each of the PCs 1, and includes a microprocessor, a main storage device, a hard disk, a display, and a network interface. The main storage device stores an attribute estimation program in advance. The microprocessor executes the attribute estimation program stored in the main storage device, and thereby respective functions such as a communication unit 2a, a preservation unit 2b, an apparatus information memory 2c, a license information memory 2d, a table memory 2e, and a customer attribute estimation unit 2f are realized in the customer attribute estimation server as shown in FIG. 1. The communication unit 2a is mainly realized by the network interface, and the preservation unit 2b and the customer attribute estimation unit 2f are mainly realized by the microprocessor. In addition, the apparatus information memory 2c, the license information memory 2d, and the table memory 2e are mainly realized by the hard disk.

Figure 3:
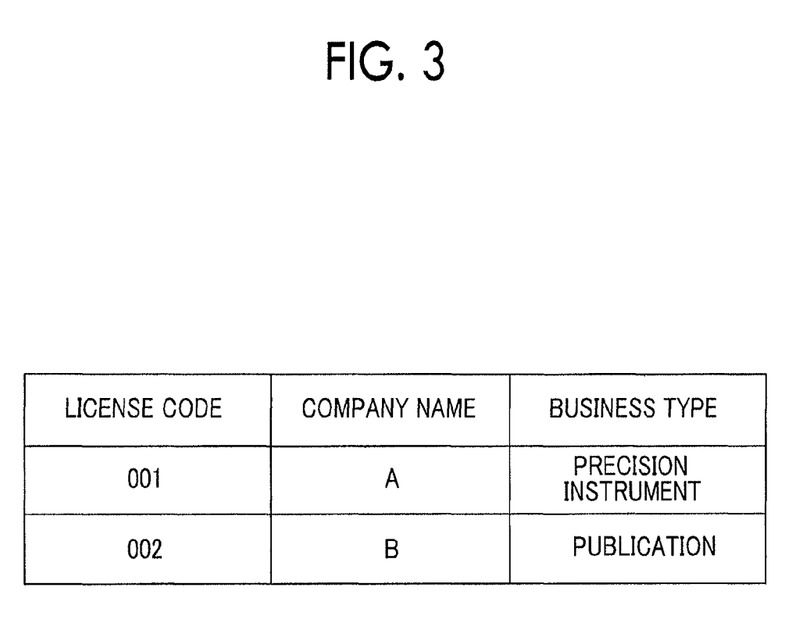
FIG. 3 is a diagram illustrating license information.
Figure 4:
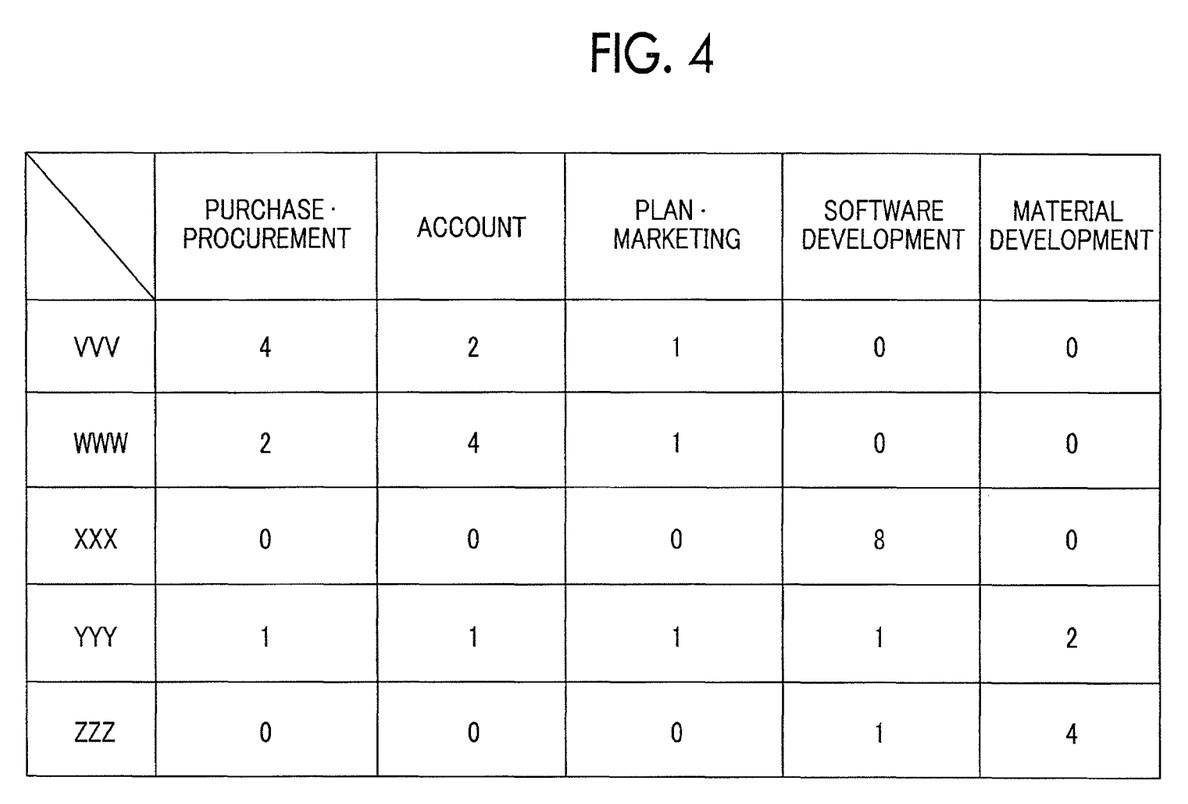
FIG. 4 is a diagram illustrating a first table.
Figure 5:
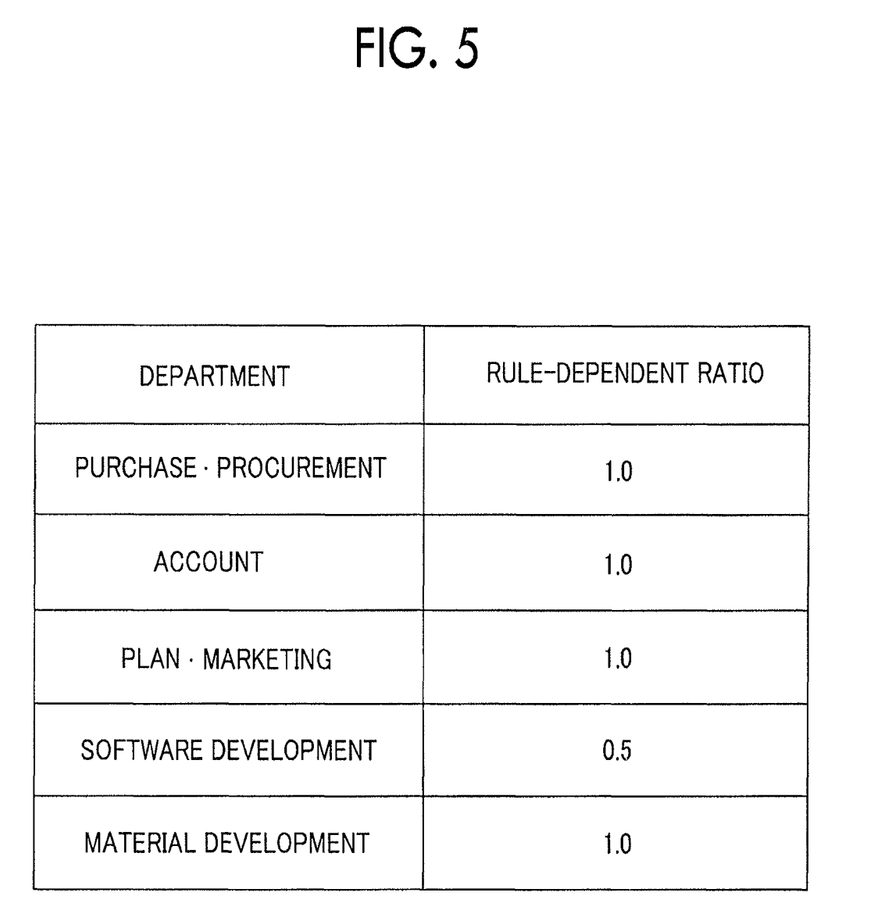
FIG. 5 is a diagram illustrating a second table.

The license information memory 2d holds license information. The license information is registered by each customer company in advance. FIG. 3 illustrates the license information. As shown in the same figure, the license information holds a license code, a company name of a company assigned with the license code, and a business type, in correlation with each other. In addition, the table memory 2e holds a first table and a second table. FIG. 4 illustrates the first table, and FIG. 5 illustrates the second table. The first table is a table indicating the strength of a relationship between software and a department class, and, as shown in FIG. 4, holds a combination of software and a department class, and a coefficient indicating the strength of a relationship between the software and the department class related to the combination. For example, since there is a high probability that account software is installed in a personal computer of the account department, a relatively large numerical value is set to a coefficient indicating the strength of a relationship between the account department and the account software. In addition, as shown in FIG. 5, the second table holds a rule-dependent ratio for each department in correlation with the department. Here, a rule-dependent ratio of a certain department indicates statistics on the number of personal computers used by each person in the department, and is a reciprocal of an average of the number of the personal computers used by each person in the department in the exemplary embodiment. For example, in the software development department, since each employee uses two personal computers on average, as shown in FIG. 5, the rule-dependent ratio of the software development department is "0.5".

Figure 6:
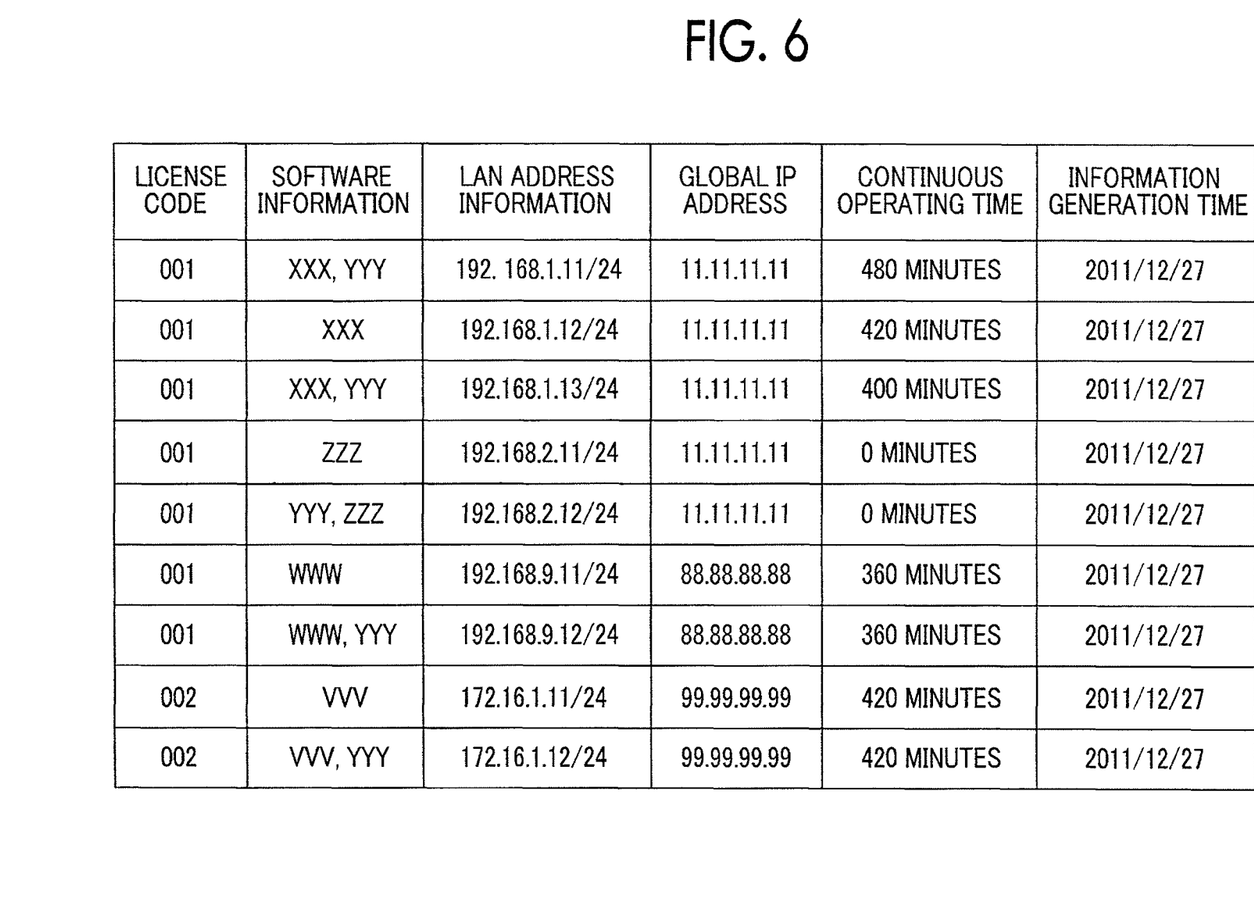
FIG. 6 is a diagram illustrating an apparatus information database.

In addition, the communication unit 2a (a software information acquisition unit, a private network information acquisition unit, an address information acquisition unit) receives apparatus information transmitted from each of the PCs 1. In addition, the preservation unit 2b preserves the apparatus information received by the communication unit 2a in the apparatus information memory 2c. The apparatus information memory 2c holds an apparatus information database in which the apparatus information received by the communication unit 2a is stored. FIG. 6 illustrates the apparatus information database.

In addition, the customer attribute estimation unit 2f collects an attribute of each customer company on the basis of the apparatus information, the license information, the first table, and the second table stored in the apparatus information database. Specifically, the customer attribute estimation unit 2f executes a process exemplified in the flowchart shown in FIG. 7.

Figure 7:
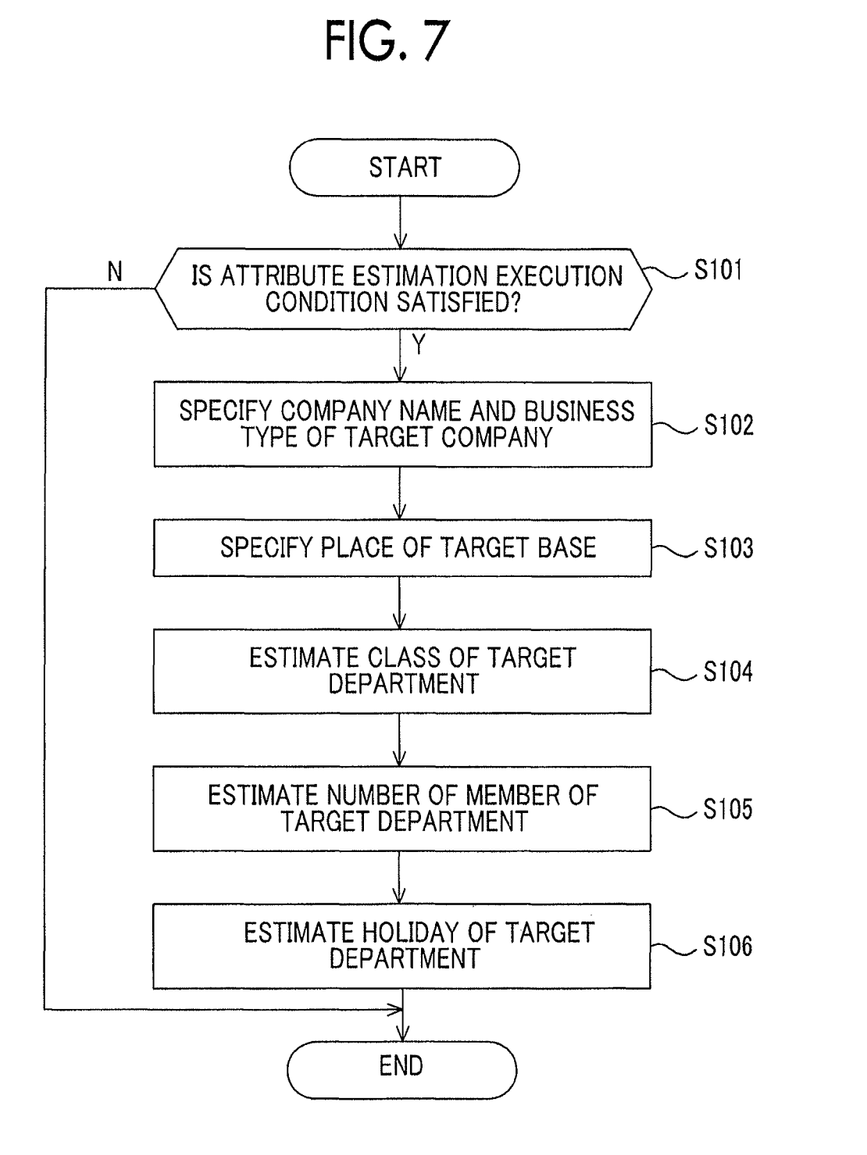
FIG. 7 is a flowchart illustrating a process performed by a customer attribute estimation server.

In other words, the customer attribute estimation unit 2f determines whether or not an attribute estimation execution condition is satisfied at a predetermined timing (S101). For example, the customer attribute estimation unit 2f determines whether or not the attribute estimation execution condition is satisfied at the timing when apparatus information is received. Here, a case where the attribute estimation execution condition is satisfied is a case where the duration which has elapsed from a certain time point, or a total number of pieces of received apparatus information (a total number of pieces of apparatus information stored in the apparatus information database) is equal to or more than a reference value.

If the attribute estimation execution condition is satisfied (Y in S101), the customer attribute estimation unit 2f executes a process for collecting attribute information of each customer company. That is to say, the customer attribute estimation unit 2f pays attention to the fact that one license code corresponds to one customer company, and, first, specifies a union G1 of license codes included in the respective pieces of apparatus information in the apparatus information database. In addition, the customer attribute estimation unit 2f executes processes after S102 for each license code included in the union G1. In the exemplary embodiment, the license codes included in the union G1 are sequentially selected one by one, and the processes after S102 are performed in relation to a target license code which is the selected license code. For example, in the apparatus information database shown in FIG. 6, the union G1 including a license code "001" of the company A and a license code "002" of the company B is specified. Thereafter, for example, the processes after S102 are performed in order of the license code "001" and the license code "002".

Hereinafter, a customer company to which the target license code is assigned is referred to as a target company (organization), and the processes after S102 will be described.

In step S102, the customer attribute estimation unit 2f specifies a company name and a business type of the target company (S102). Specifically, the customer attribute estimation unit 2f specifies a company name and a business type correlated with the target license code by referring to the license information. The process in step S102 is performed for all the license codes included in the union G1, and thereby a company name and business type of each customer company of the company C are specified.

In addition, the customer attribute estimation unit 2f pays attention to the fact that one global IP address corresponds to one business base, and also specifies a union G2 of global IP addresses included in the respective pieces of apparatus information by reading apparatus information of the PCs 1 used in the target company, that is, apparatus information including the target license codes from the apparatus information database, in step S102. For example, if the company A is a target company, a union G2 including a global IP address "11.11.11.11" and a global IP address "88.88.88.88" is specified according to FIG. 6.

In addition, the customer attribute estimation unit 2f performs processes after S103 for each global IP address in the union G2. In the exemplary embodiment, the global IP addresses in the union G2 are sequentially selected one by one, and, the processes after S103 are performed in relation to a target address which is the selected global IP address. Hereinafter, a business base corresponding to the target address is referred to as a target base, and the description is continued.

In step S103, the customer attribute estimation unit 2f (specifying unit) specifies a place of the target base from the target address (S103). In other words, the customer attribute estimation unit 2f specifies an area indicated by the target address using a well-known technique. For example, if the target address is the global IP address "11.11.11.11", the "Tokyo" area is specified, and if the global IP address is "88.88.88.88", the "Osaka" area is specified. The process in step S103 is performed for all the global IP addresses included in the union G2, and thus each place of the business base of the target company is specified.

In addition, the customer attribute estimation unit 2f (network specifying unit) pays attention to the fact that one local area network corresponds to one department, and specifies a union G3 of local area networks indicated by the LAN address information of the respective pieces of apparatus information by reading apparatus information of the PCs 1 used in the target base, that is, apparatus information including the target license code and the target address from the apparatus information database, in step S103. For example, if the company A is the target company, and the global IP address "11.11.11.11" is the target address, according to FIG. 6, a union G3 including the local area network "192.168.1.0" and the local area network "192.168.2.0" is specified.

In addition, the customer attribute estimation unit 2f performs the processes after S104 for each local area network of the union G3. In the exemplary embodiment, the local area networks of the union G3 are sequentially selected one by one, and the processes after S104 are performed in relation to a target network which is the selected local area network. Hereinafter, a department which is under the target network is referred to as a target department, and the description is continued.

In step S104, the customer attribute estimation unit 2f (department estimation unit) estimates a class of the target department (certain department) (S104). Specifically, processes described in the following are performed.

Figure 8:
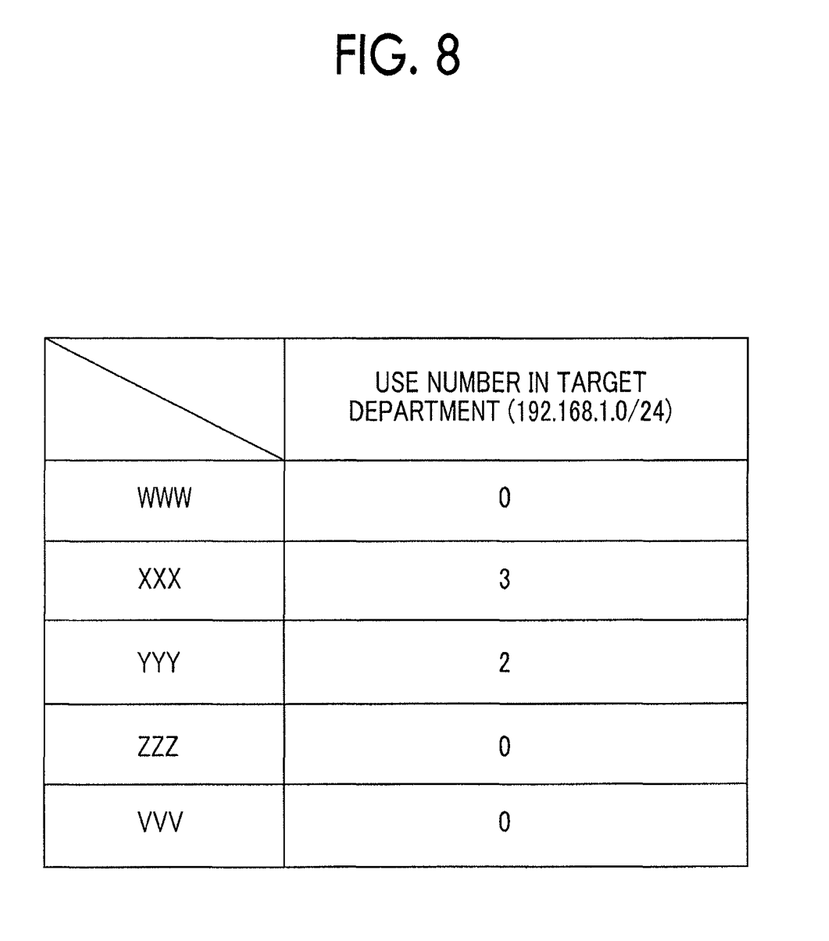
FIG. 8 is a diagram illustrating a process result.

In other words, the customer attribute estimation unit 2f specifies the number (hereinafter, referred to as a use number) of PCs 1 of the target department in which software is installed, for each piece of software of a predetermined software group G. For example, in a case of specifying the use number for certain software, the customer attribute estimation unit 2f counts the number of apparatus information including software information indicating the software of the apparatus information of the PCs 1 of the target department. As a result, the process result illustrated in FIG. 8 is obtained. In addition, the apparatus information of the PCs 1 of the target department is apparatus information including the target license code, the target address, and the LAN address information indicating the target network.

In addition, the customer attribute estimation unit 2f calculates, for each department class, an accuracy value P indicating accuracy where the department class is a department class of the target department on the basis of the use number of each piece of software and the first table shown in FIG. 4. Specifically, the customer attribute estimation unit 2f sequentially selects each of the department classes of the first table as a target class, and calculates an accuracy value P of the target class according to the following expression.

$$P = \Sigma_{s \in G}(N_s \times r_s)$$

Here, "s" indicates software of the software group G. In addition, "$N_s$" indicates the use number of the software "s", and "$r_s$" indicates a coefficient which is stored in the first table and is related to a combination of the software "s" and the target class. For example, in a case shown in FIG. 8, it is assumed that the target class is "material development". In this case, according to FIGS. 4 and 8, since "$r_{s(s=XXX)}$" is "0", and "$r_{s(s=YYY)}$" is "2", an accuracy value P of the target class is "4".

After the accuracy value P of each department class is calculated in this way, the customer attribute estimation unit 2f sets a department class of which the accuracy value P is the maximum as an estimated department class of the target department. In this way, a department class of the target department is estimated. The process in step S104 is performed for all the local area networks of the union G3, and thereby each class of the department occupying the target base is specified.

In step S105, the customer attribute estimation unit 2f (calculation unit) estimates the number of members of the target department (S105). In other words, the customer attribute estimation unit 2f specifies the number of the PCs 1 used in the target department. Specifically, the customer attribute estimation unit 2f counts the number of pieces of apparatus information of the PCs 1 of the target department. In addition, the customer attribute estimation unit 2f reads a rule-dependent ratio correlated with the estimated department class of the target department from the second table shown in FIG. 5. Further, the customer attribute estimation unit 2f calculates a product of the specified number and the read rule-dependent ratio as an estimated number of members of the target department. In this way, the number of members of the target department is estimated. The process in step S105 is performed for all the local area networks of the union G3, and thereby the number of members of each department occupying the target base is estimated.

In addition, in step S106, the customer attribute estimation unit 2f estimates a holiday of the target department (S106). In the exemplary embodiment, the customer attribute estimation unit 2f specifies a holiday of the target department on the basis of a continuous operating time of the PCs 1 used in the target department. Specifically, a continuous operating time and an information generation time are read from each piece of apparatus information of the PC 1 of the target department, and if all the items of the read continuous operating time are "0", a day of the week of the date indicated by the read information generation time is specified as an estimated holiday of the target department.

Figure 9:
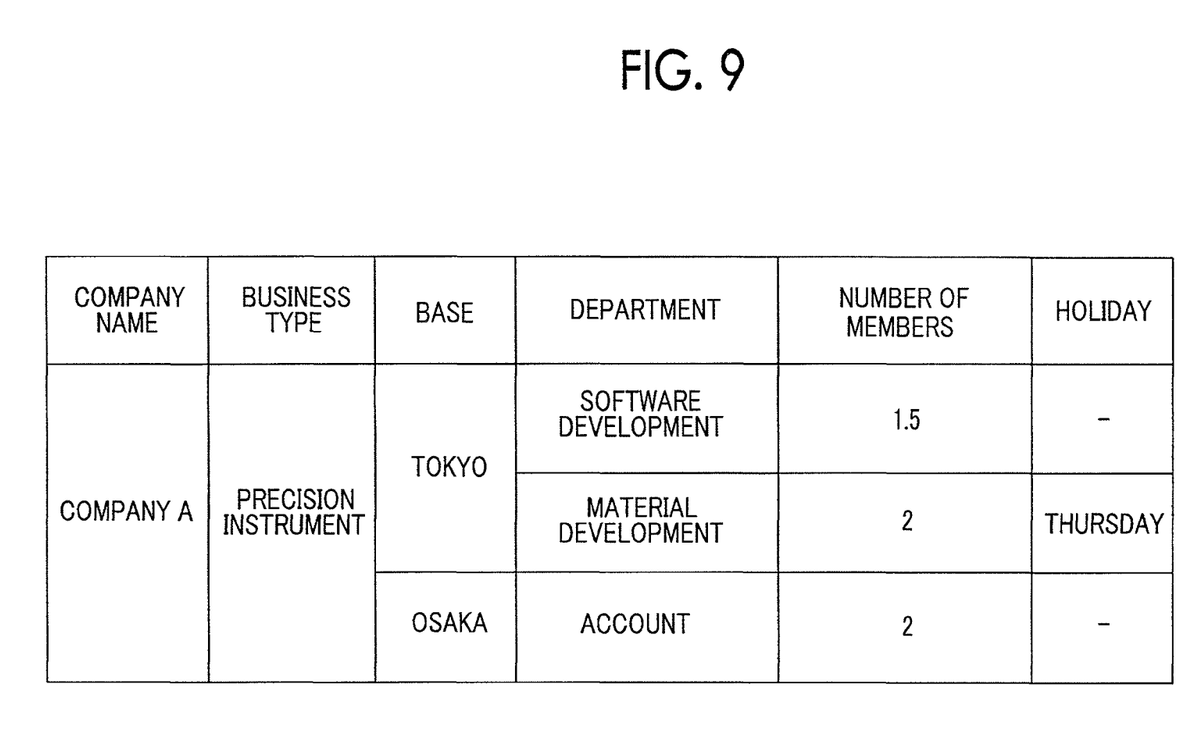
FIG. 9 is a diagram illustrating a collected company attribute.

Through the process illustrated in FIG. 7, an attribute of each customer company of the company C is collected. FIG. 9 illustrates the attribute of the company A collected by the customer attribute estimation unit 2f. After the process of FIG. 7 is completed, the customer attribute estimation unit 2f outputs the collected attribute of each customer company of the company C to an output unit such as a display or a printer connected to the customer attribute estimation server 2. For example, the customer attribute estimation unit 2f may output the collected attribute of each customer company of the company C to the output unit as a table with a title.

In addition, an exemplary embodiment of the invention is not limited to only the exemplary embodiment.

For example, the customer attribute estimation unit 2f may perform the process illustrated in FIG. 7 when the customer attribute estimation server 2 receives an attribute estimation execution request from a client apparatus (not shown). In this case, after the process in FIG. 7 is completed, an output of an attribute of each company by an output unit may be performed for the client apparatus. For example, after the process in FIG. 7 is completed, the customer attribute estimation unit 2f converts the collected attribute of each company into data for display such as CSV data or HTML data, a reply of the data for display to the client apparatus may be performed for the network interface which is an output unit.

In addition, for example, a period of time (hereinafter, referred to as operating hours) when the PCs 1 operate may be collected by the apparatus information collection program instead of the continuous operating time of the PCs 1. In addition, in step S106, the customer attribute estimation unit 2f may estimate the lunch hour of the target department from the operating hours included in the apparatus information of the PCs 1 of the target department.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An organization attribute estimation device comprising:
a hardware processor configured to perform functions comprising:
acquiring software information indicating, for each information processing apparatus used in a certain department of an organization, at least one software program used in the information processing apparatus;
determining an estimated department type of the certain department;
calculating an estimated number of persons of the certain department using a number of information processing apparatuses used in the certain department and statistical information regarding a number of information processing apparatuses used by each person in a department of the estimated department type, the statistical information being stored in a memory in correlation with the estimated department type;
acquiring, for each information processing apparatus used in the certain department of the organization, information indicating a continuous operating time of the information processing apparatus; and
using the acquired information indicating the continuous operating time of the information processing apparatus to determine a non-working day for the certain department of the organization.

2. The organization attribute estimation device according to claim 1, wherein the acquiring the software information further comprises acquiring the software information indicating the at least one software program used in the information processing apparatus for each information processing apparatus used in the organization,
wherein the hardware processor is further configured to perform functions comprising:
acquiring private network information indicating a private network to which the information processing apparatus belongs for each information processing apparatus used in the organization; and
using the acquired private network information to determine a private network provided in each of the departments existing in the organization, and
wherein the determining the estimated department type further comprises determining, for each department existing in the organization, an estimated department type of the department using the software information indicating the at least one software program used in an information processing apparatus belonging to a private network provided in the department.

3. The organization attribute estimation device according to claim 1, wherein the organization has one or a plurality of organization locations, and
wherein the hardware processor is further configured to perform functions comprises:
acquiring, for each information processing apparatus used in the organization, address information indicating an address of the information processing apparatus in a public network; and
determining at least one of the one or plurality of organization locations using the acquired address information.

4. The organization attribute estimation device according to claim 2, wherein the organization has one or a plurality of organization locations, and
wherein the hardware processor is further configured to perform functions comprising:
acquiring, for each information processing apparatus used in the organization, address information indicating an address of the information processing apparatus in a public network; and
determining at least one of the one or plurality of organization locations using the acquired address information.

5. The organization attribute estimation device according to claim 1, wherein the organization has one or a plurality of organization locations, and
wherein the hardware processor is further configured to perform functions comprising:
acquiring, for each information processing apparatus used in the organization, address information indicating an address of the information processing apparatus in a public network; and
determining at least one of the one or plurality of organization locations using the acquired address information.

6. A non-transitory computer readable medium storing a program causing a computer to function as:
a software information acquisition unit configured to acquire software information indicating, for each information processing apparatus used in a certain department of an organization, at least one software program used in the information processing apparatus;
a department estimation unit configured to use the software information acquired by the software information acquisition unit to determine an estimated department type of the certain department;
a calculation unit configured to calculate an estimated number of persons of the certain department using a number of information processing apparatuses used in the certain department and statistical information regarding a number of information processing apparatuses used by each person in a department of the estimated department type, the statistical information being stored in a memory in correlation with the estimated department type;
an operating time acquisition unit configured to acquire, for each information processing apparatus used in the certain department of the organization, information indicating a continuous operating time of the information processing apparatus; and
a non-working day estimation unit configured to use the information acquired by the operating time acquisition unit to determine a non-working day for the certain department of the organization.

7. An organization attribute estimation method comprising:
acquiring software information indicating, for each information processing apparatus used in a certain department of an organization, at least one software program used in the information processing apparatus;
determining, using a hardware processor, an estimated department type of the certain department using the acquired software information;
calculating an estimated number of persons of the certain department using a number of information processing apparatuses used in the certain department and statistical information regarding a number of information processing apparatuses used by each person in a department of the estimated department type, the statistical information being stored in a memory in correlation with the estimated department type;
acquiring, for each information processing apparatus used in the certain department of the organization, information indicating a continuous operating time of the information processing apparatus; and using the acquired information indicating the continuous operating time of the information processing apparatus to determine a non-working day for the certain department of the organization.

\* \* \* \* \*